United States Patent
Caplan et al.

(10) Patent No.: US 8,700,773 B2
(45) Date of Patent: Apr. 15, 2014

(54) LOAD BALANCING USING REDIRECT RESPONSES

(75) Inventors: Joshua Chait Caplan, Bellevue, WA (US); Carl Raymond Rabeler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 39 days.

(21) Appl. No.: 12/631,874

(22) Filed: Dec. 7, 2009

(65) Prior Publication Data
US 2011/0138052 A1    Jun. 9, 2011

(51) Int. Cl.
*G06F 15/173*    (2006.01)

(52) U.S. Cl.
USPC ........... 709/225; 709/217; 709/218; 709/219; 709/223; 709/224; 718/105

(58) Field of Classification Search
USPC ......... 709/245, 223, 224, 233, 225, 217, 218, 709/219; 718/105, 1; 707/783; 705/8; 370/238
See application file for complete search history.

(56) References Cited

U.S. PATENT DOCUMENTS

| | | | |
|---|---|---|---|
| 2003/0120593 A1 | 6/2003 | Bansal et al. | |
| 2005/0044197 A1 | 2/2005 | Lai | |
| 2006/0212350 A1 | 9/2006 | Ellis et al. | |
| 2008/0104268 A1* | 5/2008 | Farber et al. | 709/233 |
| 2009/0037367 A1* | 2/2009 | Wein | 707/783 |
| 2009/0043881 A1* | 2/2009 | Alstad | 709/224 |
| 2009/0183152 A1* | 7/2009 | Yang et al. | 718/1 |
| 2009/0245113 A1* | 10/2009 | Kamiya | 370/238 |
| 2009/0299791 A1* | 12/2009 | Blake et al. | 705/8 |
| 2010/0082787 A1* | 4/2010 | Kommula et al. | 709/223 |
| 2010/0293296 A1* | 11/2010 | Hsu et al. | 709/245 |
| 2010/0318570 A1* | 12/2010 | Narasinghanallur et al. | 707/783 |

FOREIGN PATENT DOCUMENTS

WO    2002056566 A1    7/2002

OTHER PUBLICATIONS

Kotowski, et al., "OLAP Query Processing in Grids", Retrieved at <<http://citeseerx.ist.psu.edu/viewdoc/download?doi=10.1.1.109. 4158&rep=rep1&type=pdf>> Dec. 2008, vol. 20, No. 17, pp. 2039-2048.

Manes, et al., "The Microsoft Superplatform: Setting the Bar in the Superplatform Arms Race", Retrieved at <<http:// download. microsoft.com/download/6/7/9/679833c2-467e-4fe3-847c-8206e9cd936d/The_Microsoft_Superplatform.pdf>> Aug. 17, 2005, pp. 1-44.

Jorge, et al., "Web Site Adaptation and Automation: The Site-O-Matic Project Book", Retrieved at <<http://www.liaad.up.pt/~amjorge/docs/Site-O-Matic/Jorge2008b.pdf>> Jan. 18, 2009, pp. 79.

AppDirector—Application Delivery Controller (ADC), Retrieved at <<http://www.rad-direct.com/datasheet/appdirector.pdf>>    2009, pp. 4.

* cited by examiner

*Primary Examiner* — Le H Luu
(74) *Attorney, Agent, or Firm* — Nicholas Chen; Kate Drakos; Micky Minhas

(57) ABSTRACT

Described is a technology by which load balancing is accomplished by HTTP redirect responses. A web application (rather than a server) receives an HTTP request, such as identifying a database that is available on one or more servers. From among those servers having the database, the web application selects a server based upon server load information collected from each of the servers. Load balancing is accomplished by selecting a server based upon the load information and which servers have the most recent data, and returning an HTTP redirect response that identifies the selected server. Also described is using redirection to refresh a database on a server without affecting any other databases on that server, by removing that server from those available while the database is refreshing, whereby requests for that database will not be redirected to that server while being refreshed.

20 Claims, 11 Drawing Sheets

LOAD BALANCING USING REDIRECT RESPONSES

BACKGROUND

Load balancing generally refers to distributing networking load among a plurality of available servers. Typical load balancing solutions are based upon routing. For example, one simple load balancing solution operates by routing all requests to all available servers, each of which is assigned a hash bucket (range). Each server in turn hashes each request's IP address and only handles those that fall into its hash bucket, while ignoring any others.

Many enterprises have certain types of databases (e.g., online analytical processing, or OLAP databases) that run on multiple servers. In general, enterprises want to have instances of these databases always available, one-hundred percent of the time. At the same time, the databases need to be refreshed, and different databases are refreshed at different times and on different schedules. For example, some may be refreshed once a week, some once per day, while others are refreshed multiple times (e.g., sixteen times) per day.

Moreover, the databases need to be load balanced between the servers. Existing network load balancing solutions, such as network load balancing services (NLBS), have a number of drawbacks when used with such differently refreshed databases. For example, all the databases on a server need to be taken offline to refresh any single database, because load balancing software operates at the server level. Further, NLBS monitors server availability rather than the availability of services running on the server, which causes other problems. For example, if a service stops running on a server, requests for that service are still sent to that server because the server is considered running.

NLBS also needs to maintain session "stickiness" because multiple queries are often associated with a single session. For example, queries sent to a client service such as Reporting Services to generate a report need to go to the same server, otherwise Reporting Services will generate errors. NLBS enforces session stickiness based on the IP address of the client service, which does not change, whereby all queries to a particular client service need to go to the same server.

What is desirable is a load balancing solution for servers that overcomes the above drawbacks, e.g., is capable of closely approaching or achieving one-hundred percent database uptime, while allowing different databases to be refreshed without affecting other databases on the same server. Further, if a service running on a server crashes or otherwise goes offline, the request is not sent to that failed service, even when the server running that service remains otherwise operational.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a load balancing web application (rather than a server) receives a request (e.g., an HTTP request) directed towards a server set comprising one or more servers capable of handling that request. For example, the request may identify a database, and the database may be available on a number of servers that can thereby each handle the request.

From among the server set, the load balancing web application selects a server based upon server load information and based on the server with the most recent version of the data. The load may be maintained as status information collected from each of the servers. By processing the server load information, load balancing is accomplished by selecting a server based upon the load information and returning to the requesting client a redirect (e.g., HTTP) response that identifies the selected server. The client is then automatically redirected to the selected server, whereby the selected server may then handle the request.

In one aspect, redirection may also be used to refresh a database on a server without affecting any other databases on that server. To this end, that server is removed from the server set while the database is refreshing. As a result, requests for that database will be redirected only to other servers that also have that database (but are not currently being refreshed), until the database refresh operation is completed on that server.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a load balancing solution that uses HTTP redirects (or the like) to balance network (e.g., Analysis Services) requests between two or more servers, (without double-hop/impersonation). In one implementation in which the load balancing solution is configured to work with Analysis Services, the load balancing solution may direct queries based on the actual load on the server, from among those servers having the most recent data. The load balancing solution also stops sending requests to a server on which Analysis Services has stopped running. Further, the technology allows for a single database to be refreshed without affecting other databases.

While HTTP, OLAP databases/data structures (cubes) and Analysis Services are used in some of the examples herein, it should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and network load balancing in general.

Figure 1:
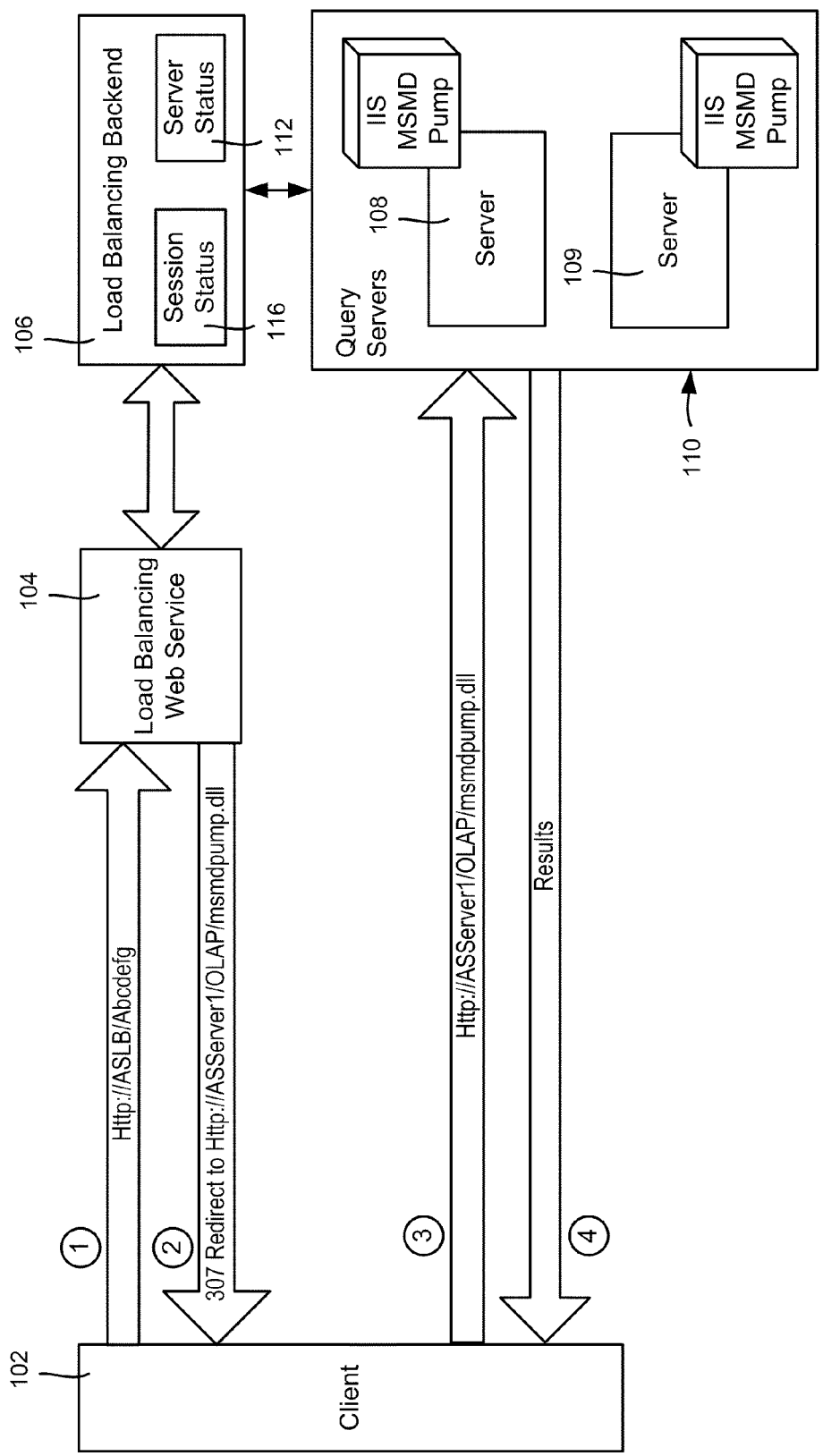
FIG. 1 is a block diagram showing example components for load balancing via redirect responses.

FIG. 1 shows various aspects related to network load balancing using a redirect response, in which the arrows labeled with circles show a general flow of operations. In general, a client 102 sends an HTTP request (the arrow labeled one (1)) to a load balancing web service 104, requesting a new session (or possibly as part of an existing session). In the request, the database is identified, e.g., Http://ASLB/Abcdefg.

As described below, the load balancing web service 104 in conjunction with a load balancing backend 106 (e.g., a server) determines which query server (e.g., the server 108 or 109) has the database and is able to handle the client request. To this end, the load balancing backend 106 maintains server status information for the query servers 110, including load-related information, as also described below.

The load balancing web service 104 returns a redirect response (the arrow labeled two (2)) to that server, e.g., the server 108. Then client then re-sends the request to the identified server 108 and obtains appropriate results (the arrows labeled three (3) and four (4)).

To summarize in an example implementation comprising Analysis Services and OLAP databases, the load balancing solution uses HTTP redirects to distribute Analysis Services requests between two or more servers. When users connect, they supply a URL that points to a load balancing web application (e.g., provided by the load balancing service 104 and backend 106) instead of a server name as the data source; note that the URL contains the name of the OLAP database the user is trying to access, e.g., http://ASLB/Abcdefg.

When the load balancing web application receives the request and determines that the request is for a new session (rather than part of an existing session already being redirected to a particular server), the load balancing web application looks up which OLAP database the user is trying to reach and then determines to which server to send the request. The load balancing web application does this by tracking on which server the database is current and available. If there is more than one server available to handle the new session, the load balancing web application may use a scheme such as round robin and/or analyze the server load to choose the server. The load balancing web application then sends an HTTP redirect (307 or 301) response back to the client pointing them to the URL of the Analysis Services server. The client then resends the request to that server. Note that unlike NLBS, Analysis Services load balancing more efficiently distributes the requests between two or more servers; because it may use HTTP, this works for any Analysis Services client including SQL Server Reporting Services, as well as any middle tier application that queries the Analysis Services database on behalf of multiple clients, e.g., SharePoint®, and it will work on any network.

Figure 2:
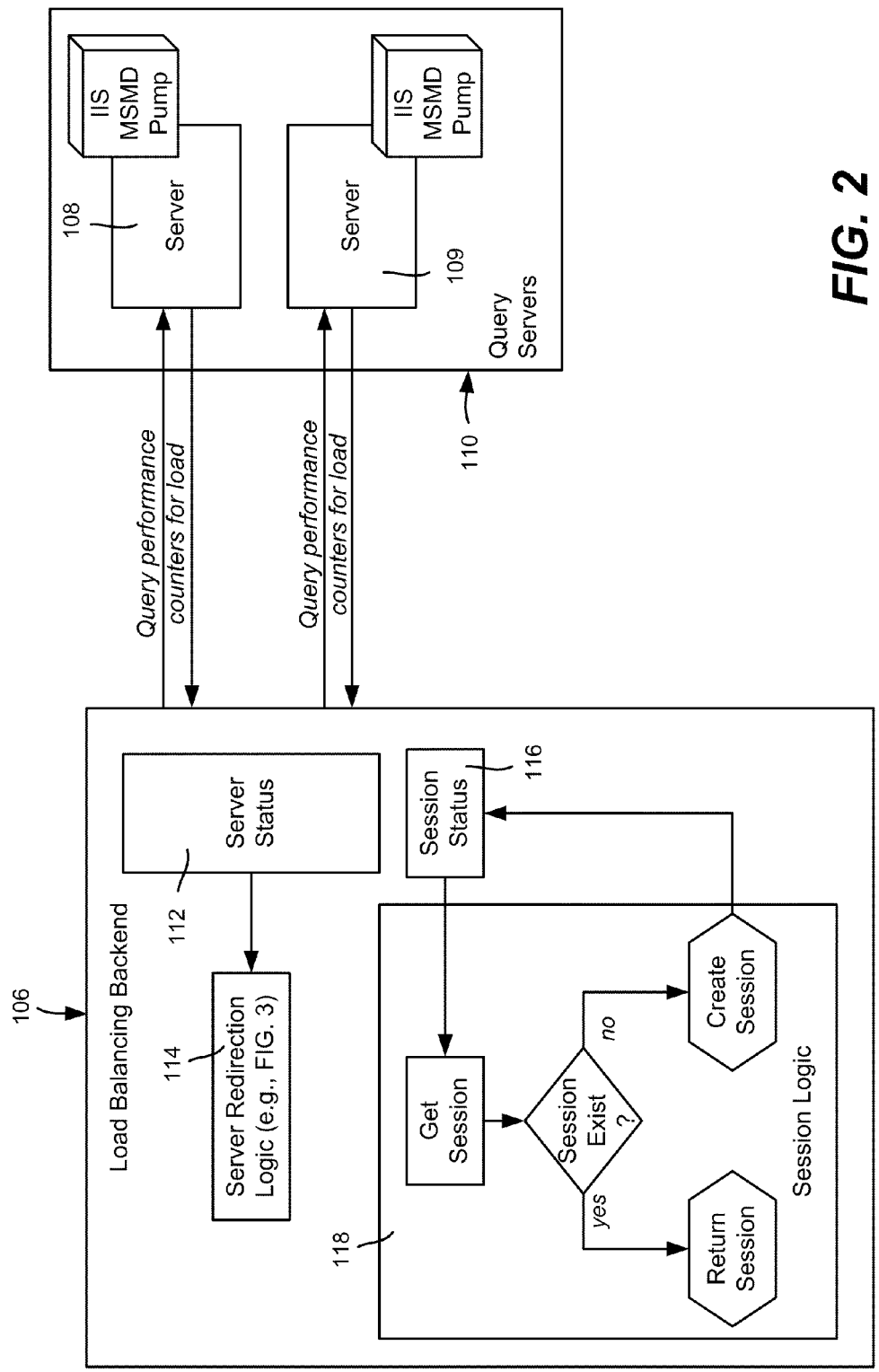
FIG. 2 is a block diagram showing example components for redirecting a client based on session and/or server load information.

FIG. 2 shows additional information about the load balancing backend 106. In general, in a background task, the load balancing backend 106 queries the server for load information, e.g., as maintained in counters. For example, CPU performance counts may be used, alone or in conjunction with other data, such as amount of memory in use, input/output measurements/data, bandwidth measurements/data, machine capability and/or the like. The information is maintained in a server status data store 112 or the like, which for example may be processed by server redirection logic 114 to select a server as described below with reference to FIG. 3.

In one implementation, the querying for collecting the load information is performed every ten seconds, such that the load measure is an average load over an interval rather than an instantaneous load. As can be readily appreciated, other ways of implementing the load measure may be provided, such as depending on the application or service that the servers are handling, class of hardware, number of processors, amount of memory, speed of disk subsystem, and so forth. For example, the interval time can be longer or shorter (or possibly instantaneous for steady loads), the server can push the load information for collection, and so on.

Figure 3:
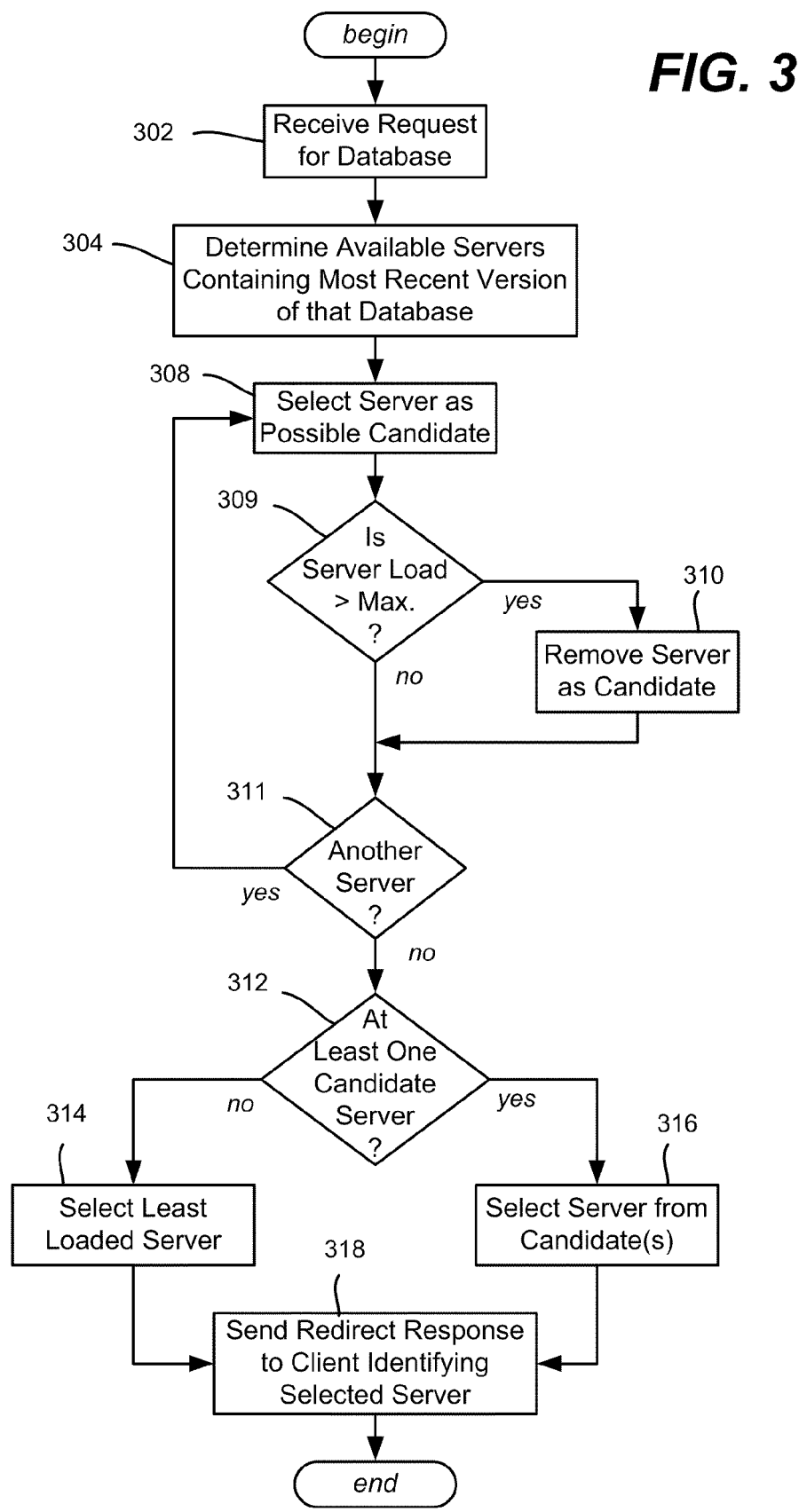
FIG. 3 is a flow diagram showing example steps that may be taken to select a server for redirecting a request thereto based upon which servers are available to handle the request and based upon server load information and based on currency of the data.

FIG. 3 provides example steps that summarize one load balancing solution, beginning at step 302 where a request is received at the load balancing web service to access a database or the like (e.g., program) that is needed to handle that request. At step 304, the load balancing backend determines which server set (comprising one or more servers) has the most recent version of that database currently available and functioning, such as by accessing a per-database list of active servers as part of the server status information that load balancing backend maintains. Note that there may be a list of one or more servers per database, e.g., a database A may have a list containing servers 108 and 109 because database A is available on those servers, whereas a database B may be only on server 108, and thus its list will only list server 108.

Steps 308-311 represent processing (filtering) the list of servers to remove any server or servers that have too much load, thereby obtaining a set of candidates for selecting one for client redirection. In other words, step 309 checks the actual load (e.g., as obtained via the counters) against the threshold load; this threshold may be varied depending on the application/services/databases that are being provided by the servers. Note that if the server list is maintained in a database form, a single query can filter the list to obtain the candidate or candidates below the threshold server load, e.g., perform the logic of steps 308-311.

It is possible that no servers are operating below the threshold server load, and thus the candidate list after filtering is empty. If so, as evaluated at step 312, then the least-loaded server is selected for redirection (step 314). If there is at least one server on the below-threshold filtered candidate list, then one of these servers is selected for redirection (step 316). Note that any suitable scheme may be used to select from among multiple candidates, e.g., a round-robin scheme, random distribution scheme, or other such scheme may be used. Step 318 represents returning the redirect response to the client that identifies the selected server for redirection.

Note that if the servers are all highly loaded, based on the threshold or an independent measure (e.g., a higher threshold and/or for a lengthy, consistent amount of time), one or more virtual machines can be provisioned as needed, e.g., automatically on demand. Each virtual machine can be incorporated into the load balancing solution by adding it to the list of available servers as another machine; (the virtual nature of the machine is basically transparent to the solution). Clients are then redirected to the newly provisioned machine or machines. Similarly, if de-provisioned, a (virtual) machine may be removed the list of available servers. This may happen whenever step 314 is executed, for example, or via an independent process. Thus, as used herein, "server" does not necessarily refer to a single physical machine or set of clustered machines, but also may correspond to a virtual machine within a larger machine and/or be part of any other arrangement in which multiple servers run on a machine.

Returning to FIG. 2, a client is not (ordinarily) redirected to a different server for a set of queries made within the same session. This facilitates caching and the like as well as other efficiencies in operation. To ensure that redirection is to the same server within a session, the load balancing backend 106 maintains a session status data store 116 for maintaining session status information. Sessions may be based upon IP address, user (e.g., username), database identity and optional URL parameters. For example, by adding a parameter onto the URL, a client may specifically request a new session.

When a server access request is received, session logic 118 determines whether the session is an existing session, and if so, provides the redirection response to the same server. If the session does not yet exist, the session logic 118 creates one and maintains information for that new session in the session status data store 116, and returns the redirection response. Note that HTTP allows for redirection caching, in which a client basically remembers where a previous redirection took place. For clients that operate in this way, such a client need not go through the load balancing web service 104 (and therefore also the load balancing backend 106/session logic 118) for each query within a session, which is more efficient.

Figure 4:
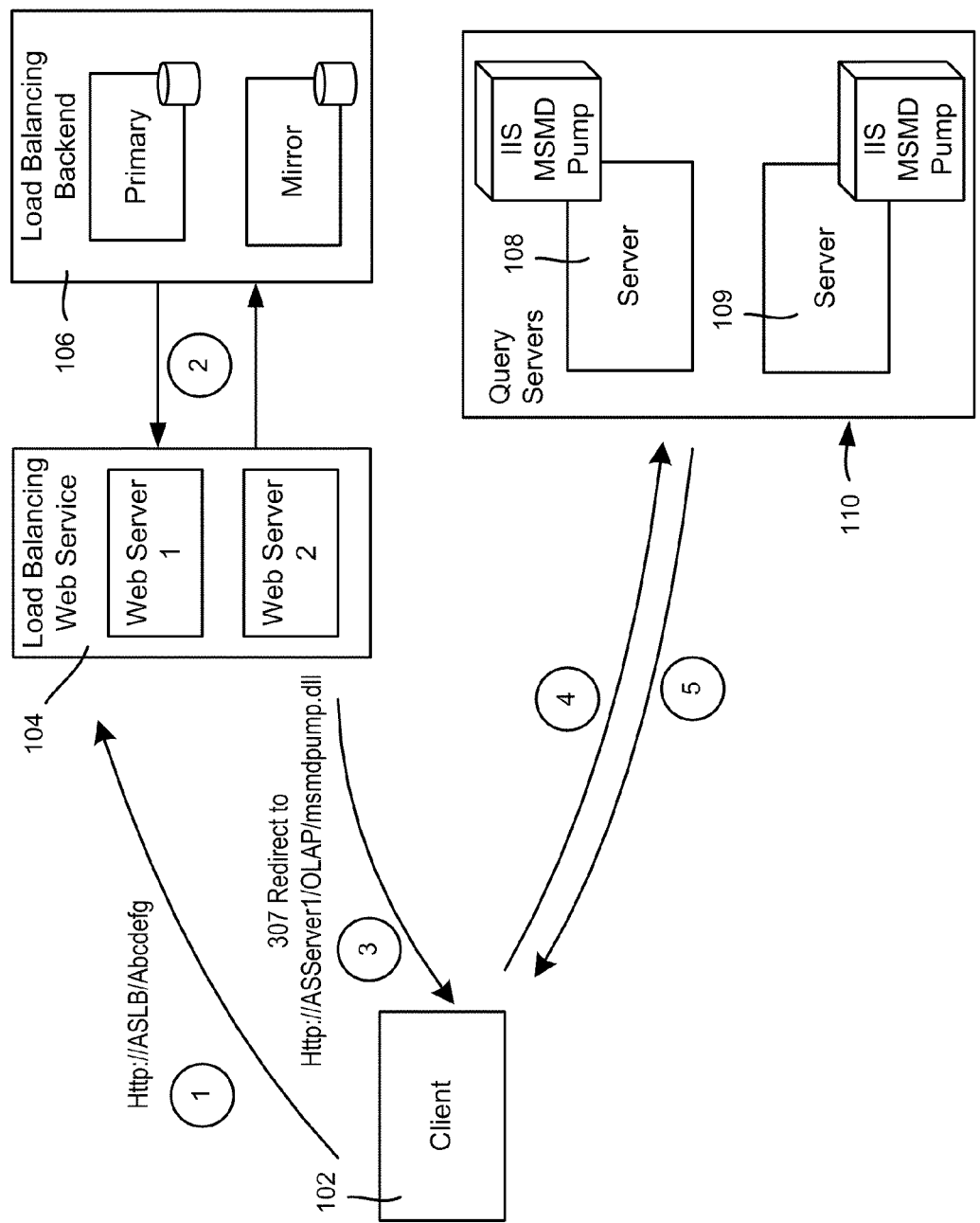
FIG. 4 is a block diagram showing example components for load balancing via redirect responses in a highly-available configuration.

With respect to availability, FIG. 4 shows how the above implementations may be made highly available. For example, the load balancing web service 104 can contain multiple web servers (two are shown) for handling requests. If configured to handle a server failure, e.g., by arranging the servers as a highly-reliable server cluster with failover, the load balancing web service 104 can approach one-hundred percent availability. Similarly, the load balancing backend 106 can be clustered, can contain a mirrored database, and so forth to make it highly available.

FIGS. 5-10 are directed towards aspects related to servers that run databases, for example OLAP cubes for use by analysis services. Note that databases and cubes are only examples because they are frequently updated; other data, components, programs and services provided by a server may work in the same way.

As described above, different databases may be distributed among many servers. Moreover, the databases need not be evenly distributed. For example, if a particular database is heavily used, then that database may be run on an appropriate number of servers (e.g., five) rather than a less-heavily used database run on a lesser number of servers (e.g., two). Because load balancing as described above may be per database by maintaining a list of servers for each database, and then updating that list as servers are added or removed, and/or as databases are updated, various benefits are obtained.

Figure 5:
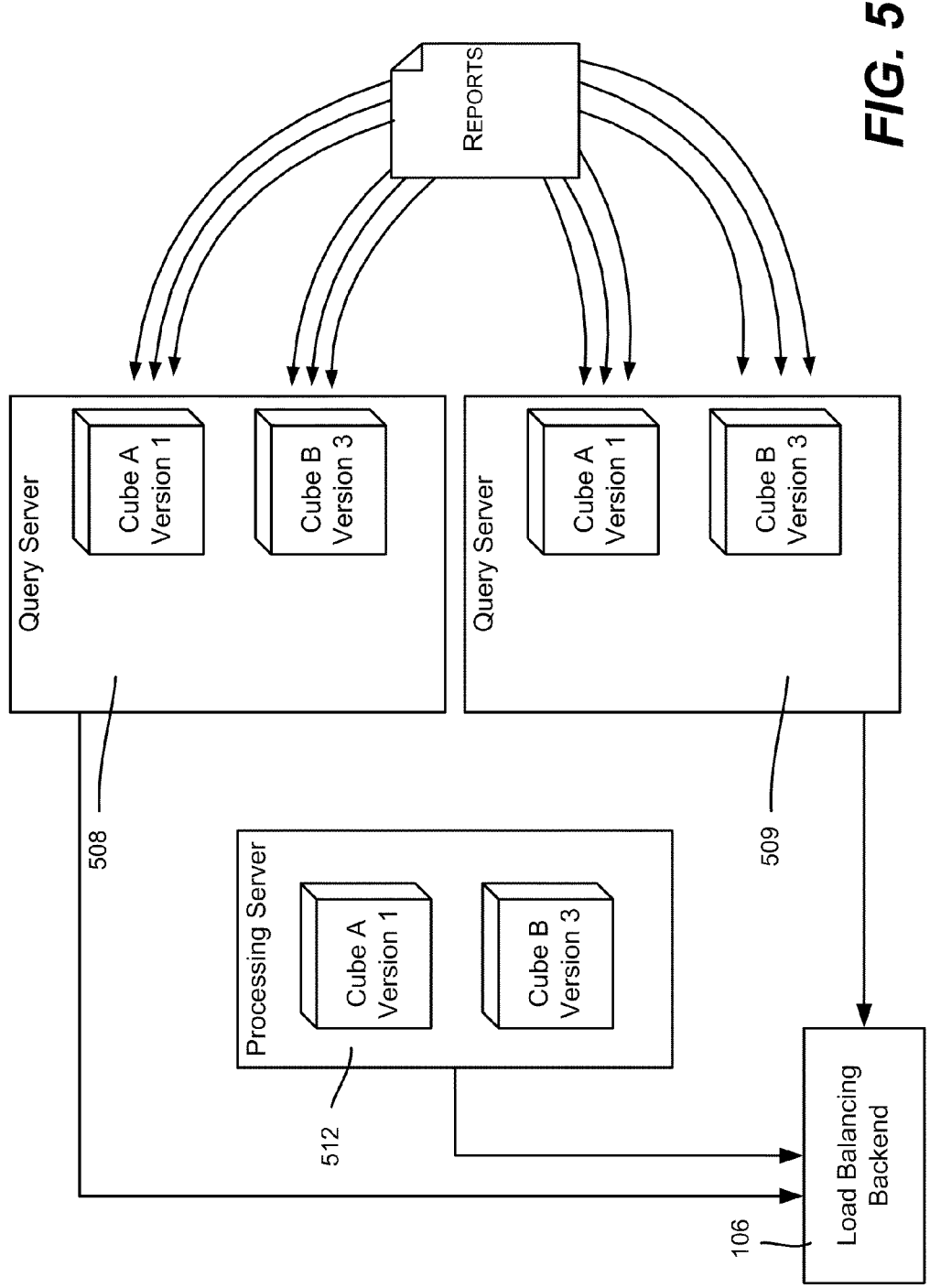
FIGS. 5-10 are block diagrams showing how via redirects, a database (e.g., a cube) may be refreshed on a server without affecting any other database on that server.

For example, consider in FIG. 5 that queries are being handled with corresponding reports being generated by cubes on query servers 508 and 509, with the load balanced among the servers using redirects as described above. A processing server 512 is shown as maintaining the most up-to-date version of the cubes, that is, Cube A, Version 1 and Cube B, Version 3.

Figure 6:
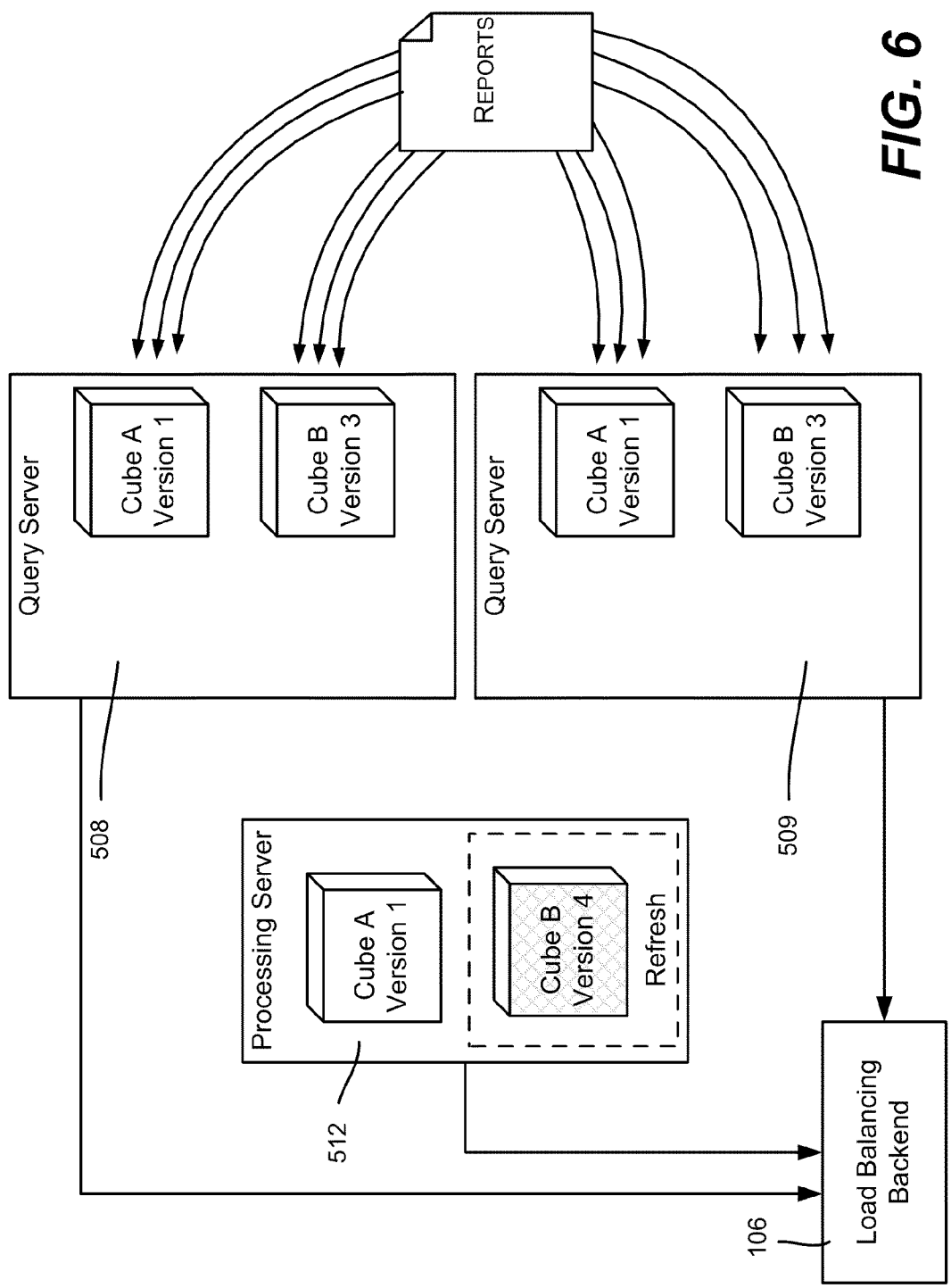
Figure 7:
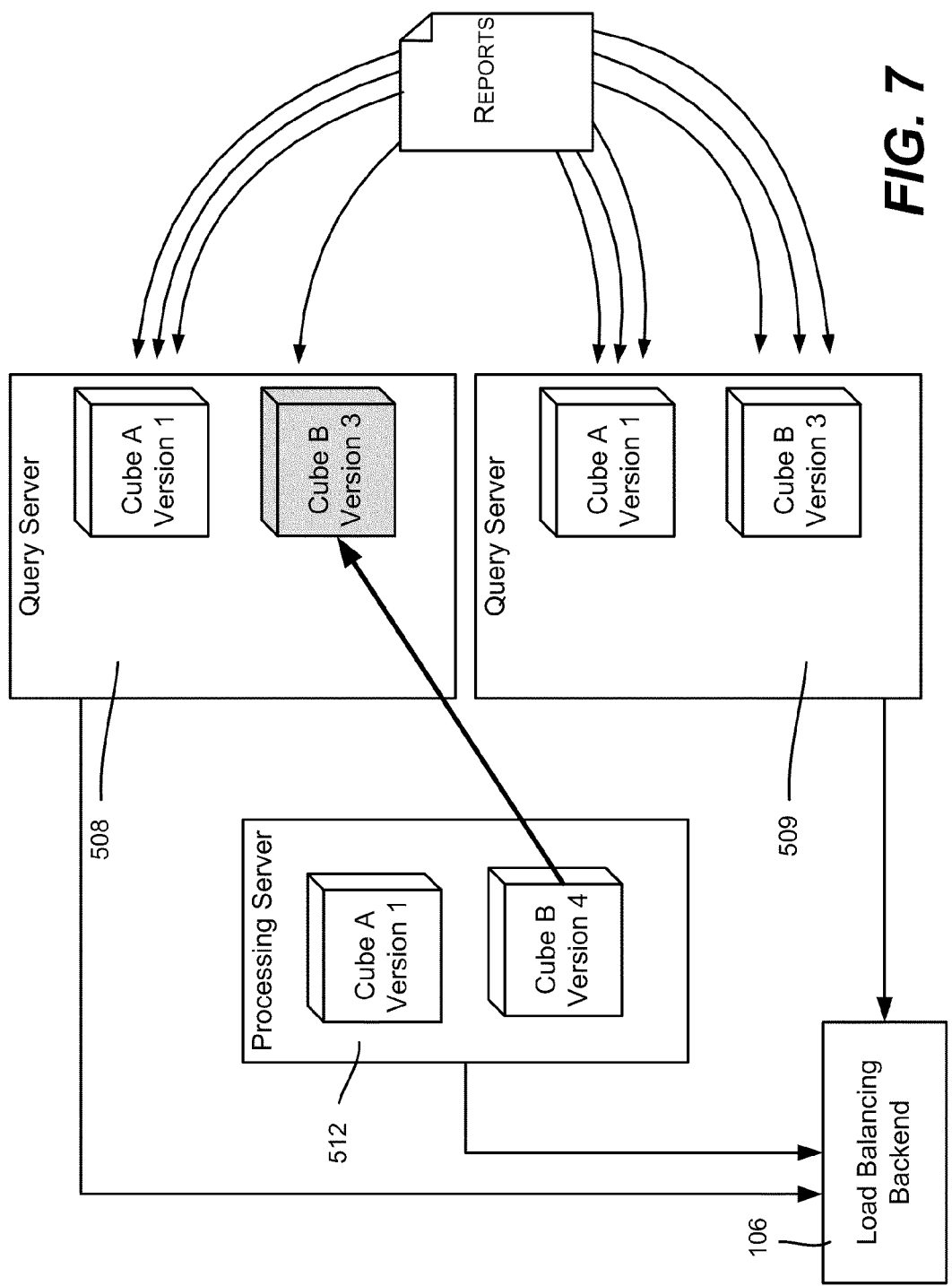
Figure 8:
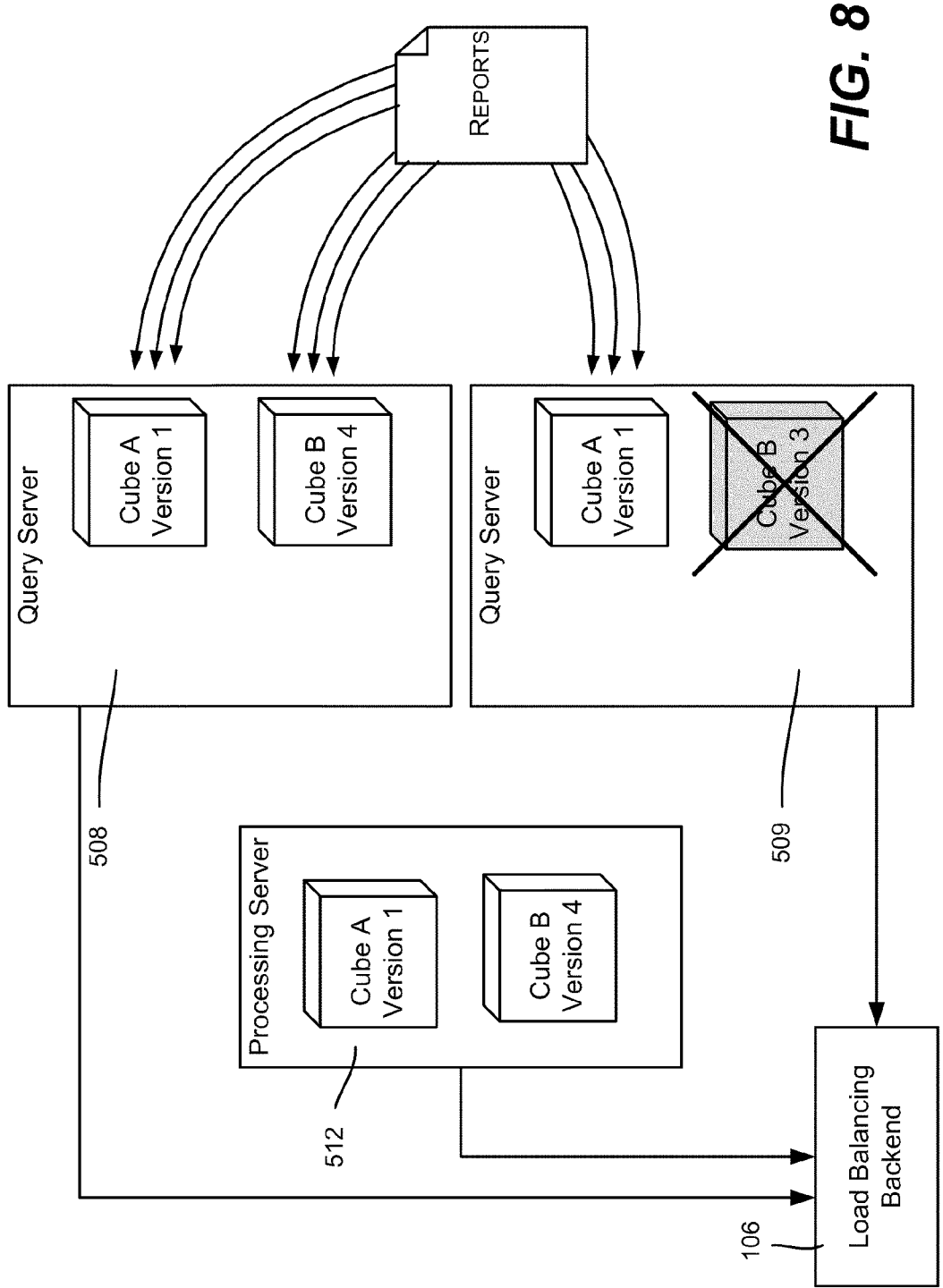

At some time later as represented in FIG. 6, Cube B is to be refreshed from version 3 to Version 4. FIGS. 7 and 8 represent how this is accomplished without taking the server offline, basically by just taking that server out of the list for that database.

More particularly, Cube B, Version 3 on the query server 508 is marked as offline, as indicated by the shaded coloring. The server list for this cube (database) maintained at the load balancing backend 106 is updated such that the query server will continue to use Cube B, Version 3 only to handle any existing requests (for at least awhile), but will use redirects to send any new requests to the query server 509.

When there are no more existing requests, the processing server switches to refresh the query server 508 to Cube B, Version 4, including updating the list for this cube maintained at the load balancing backend 106. Via redirection, requests for Cube B are then handled on that server 508, now running Version 4.

Figure 9:
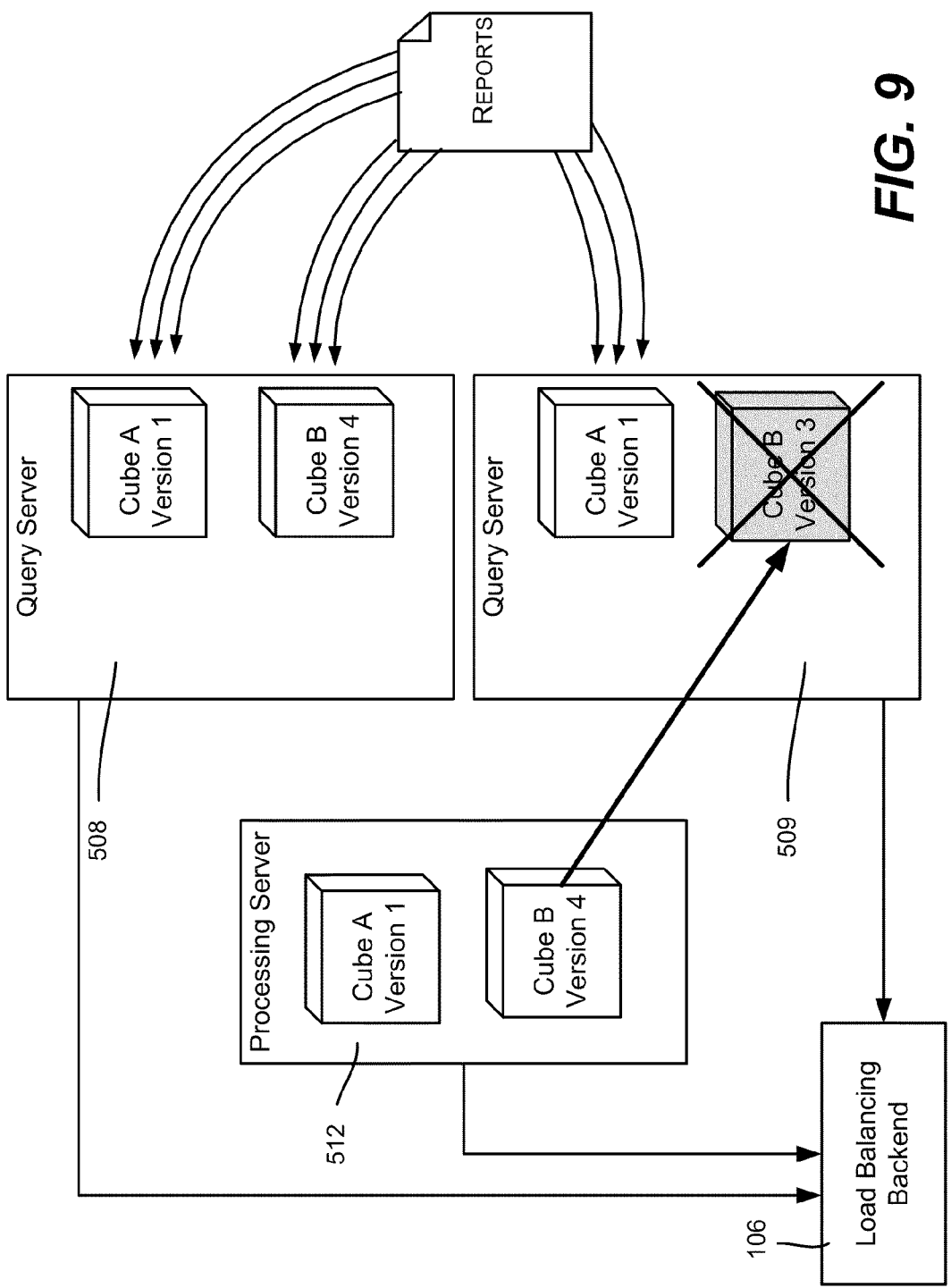
Figure 10:
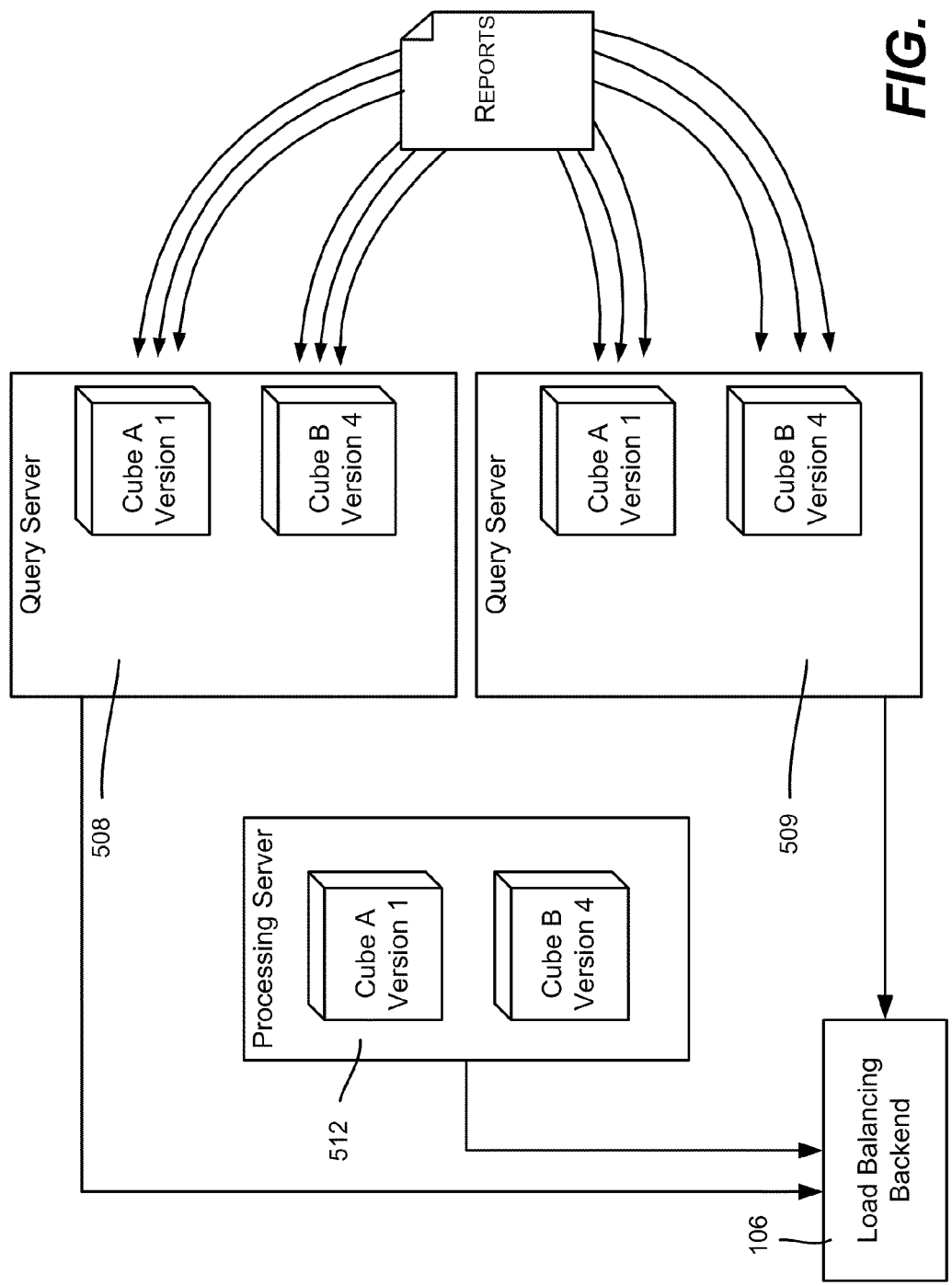

As represented in FIGS. 8-10, Cube B, Version 3 is then replaced on the other query server 509 with cube B, version 4 by redirects and dynamically maintaining the list. That is, the per-database/server list is updated so that redirects are also allowed to the query server 509 once cube B, version 4 is available.

Note that in this example, Cube A, Version 1 was not changed, nor were either of the servers 508 or 509 ever stopped to perform the update. In this manner, via the above technology, different OLAP databases/cubes with different refresh schedules are allowed to be on the same server without affecting each other.

In addition to facilitating refreshes, the load balancing solution may monitor service (e.g., Analysis Services) on each server, as well as the server. If the load balancing solution detects that Analysis Services or a server goes offline or is unreachable, the list is updated, whereby the logic automatically stops sending requests to that service/server, (as well as optionally sending out an email or other communication alerting administrators of the problem). Note that in contrast, with NLBS, if Analysis Services goes offline but the server remains online, NLBS continues to send requests to the server causing problems (as well as not providing an automatic notification).

Further, when a server is taken down intentionally, e.g., by a script, the load balancing backend's list is automatically updated as part of the script and requests are not longer sent to the server. When the server comes back online, the script automatically updates the load balancing backend's list, whereby requests may again be sent to the server.

Exemplary Operating Environment

Figure 11:
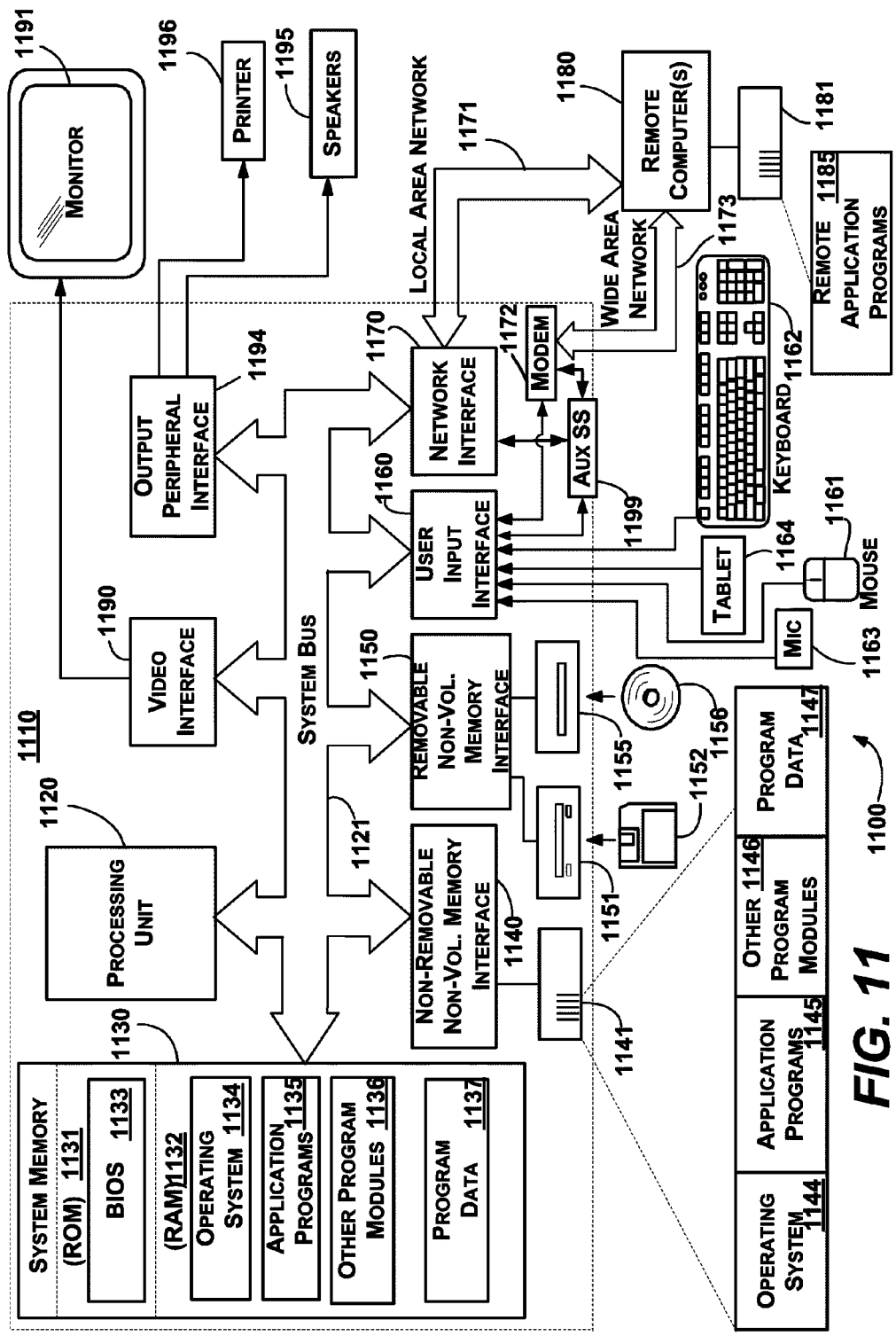
FIG. 11 shows an illustrative example of a computing environment into which various aspects of the present invention may be incorporated.

FIG. 11 illustrates an example of a suitable computing and networking environment 1100 on which the examples of FIGS. 1-10 may be implemented. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment 1100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 11, an exemplary system for implementing various aspects of the invention may include a general purpose computing device in the form of a computer 1110. Components of the computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer-readable media. Computer-readable media can be any available media that can be accessed by the computer 1110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136 and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media, described above and illustrated in FIG. 11, provide storage of computer-readable instructions, data structures, program modules and other data for the computer 1110. In FIG. 11, for example, hard disk drive 1141 is illustrated as storing operating system 1144, application programs 1145, other program modules 1146 and program data 1147. Note that these components can either be the same as or different from operating system 1134, application programs 1135, other program modules 1136, and program data 1137. Operating system 1144, application programs 1145, other program modules 1146, and program data 1147 are given different numbers herein to illustrate that, at a minimum, they are different copies. A user may enter commands and information into the computer 1110 through input devices such as a tablet, or electronic digitizer, 1164, a microphone 1163, a keyboard 1162 and pointing device 1161, commonly referred to as mouse, trackball or touch pad. Other input devices not shown in FIG. 11 may include a joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. The monitor 1191 may also be integrated with a touch-screen panel or the like. Note that the monitor and/or touch screen panel can be physically coupled to a housing in which the computing device 1110 is incorporated, such as in a tablet-type personal computer. In addition, computers such as the computing device 1110 may also include other peripheral output devices such as speakers 1195 and printer 1196, which may be connected through an output peripheral interface 1194 or the like.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include one or more local area networks (LAN) 1171 and one or more wide area networks (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160 or other appropriate mechanism. A wireless networking component such as comprising an interface and antenna may be coupled through a suitable device such as an access point or peer computer to a WAN or LAN. In a networked environment, program modules depicted relative to the computer 1110, or portions thereof, may be stored in the remote memory storage device. By way of example, and not limitation, FIG. 11 illustrates remote application programs 1185 as residing on memory device 1181. It may be appreciated that the network connections shown are exemplary and other means of establishing a communications link between the computers may be used.

An auxiliary subsystem 1199 (e.g., for auxiliary display of content) may be connected via the user interface 1160 to allow data such as program content, system status and event notifications to be provided to the user, even if the main portions of the computer system are in a low power state. The auxiliary subsystem 1199 may be connected to the modem 1172 and/or network interface 1170 to allow communication between these systems while the main processing unit 1120 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method performed on at least one processor, comprising:
   in a computing environment comprising a database that runs on a plurality of servers:
   receiving from a client a communication at a web application, the communication corresponding to a request to be handled by a server;
   selecting, based upon server load information that includes availability data for each database indicating on which server or servers each database is available, which of the plurality of servers is a selected server to handle the request, the availability data being updated so as to refresh a database on a server, without affecting the operation of another database on that server, by not redirecting requests for that database to that server while the database is being refreshed; and
   sending to the client from the web application a redirect response in response to the request, in which the redirect response identifies the selected server.

2. The method of claim 1 wherein selecting which of the plurality of servers is the selected server to handle the request comprises selecting the server having the least load according to the server load information.

3. The method of claim 1 wherein selecting which of the plurality of servers is the selected server to handle the request comprises choosing a plurality of candidate servers having less than a threshold load according to the server load information, and selecting the selected server from among the plurality of candidate servers.

4. The method of claim 3 wherein selecting the selected server from among the plurality of candidate servers comprises using a round-robin selection scheme.

5. The method of claim 1 wherein the request to be handled by a server comprises a request to a particular database, and further comprising selecting a set of servers on which that database is available as the plurality of servers from which to select the selected server.

6. The method of claim 5 further comprising, detecting that the database on one server has become unavailable, and further comprising, updating the set of servers so as to not send requests for the particular database to that server.

7. The method of claim 5 further comprising, detecting that one of the servers of the set has become unavailable, and further comprising, updating the set of servers so as to not send requests for the particular database to that server.

8. The method of claim 1 further comprising, accessing session status information to determine whether the request is part of an existing session or needs a new session, and creating the new session if the request is not part an existing session.

9. The method of claim 1 further comprising, collecting the server load information over an interval.

10. The method of claim 1 wherein the request is an analysis service request directed toward an OLAP database.

11. A system comprising:
    in a computing environment comprising a database that runs on a plurality of servers:
    a load balancing web application that receives from a client a communication corresponding to a request to be handled by a server, the load balancing web application collecting data corresponding to server status information, the server status information including server load information, availability data for each database indicating on which server or servers each database is available, which of the plurality of servers are available to handle the request, and the load balancing web application including logic that selects, based upon the server load information, which server from among those available servers is a selected server for handling the request, and returns to the client from the web application a redirect response identifying that server, the availability data being updated so as to refresh a database on a server, without affecting the operation of another database on that server, by not redirecting requests for that database to that server while the database is being refreshed.

12. The system of claim 11 wherein the request is an analysis service request directed towards an OLAP database.

13. The system of claim 12 wherein the load balancing web application monitors online or offline status of an analysis service on each server so as to not redirect requests to a server on which the analysis service is offline.

14. The system of claim 11 wherein the request is provided as an HTTP request, and wherein the redirect response comprises an HTTP redirect response.

15. The system of claim 11 wherein the load balancing web application comprises a load balancing web service accessed via a URL, coupled to a load balancing backend that communicates with the plurality of query servers.

16. The system of claim 11 wherein the server load information is collected from one or more counters associated with each server.

17. One or more computer storage devices having computer-executable instructions, which when executed perform steps, comprising:

in a computing environment comprising a database that runs on a plurality of servers:

receiving from a client an HTTP request at a load balancing web service;

determining a server set comprising at least one server that is configured to handle the request;

processing server load information associated with each server to select which server of the set is a selected server to handle the request, the server load information comprising availability data for each database indicating on which server or servers each database is available, the availability data being updated so as to refresh a database on a server, without affecting the operation of another database on that server, by not redirecting requests for that database to that server while the database is being refreshed; and returning to the client from the web application an HTTP redirect response that identifies the selected server in response to the received HTTP request.

18. The one or more computer storage devices of claim 17 wherein processing the server load information comprises removing any server from the server set having a load above a threshold load.

19. The one or more computer storage devices of claim 18 wherein if no server remains after removing any server from the server set, selecting as the selected server a server from the set having the least load.

20. The one or more computer storage devices of claim 17 wherein the server set comprises one or more servers having a particular database identified in the HTTP request, and having further computer-executable instructions comprising, removing a server from the server set while the particular database is being refreshed on that server.

* * * * *